United States Patent Office 3,337,566
Patented Aug. 22, 1967

3,337,566
BETA-HYDROXY BIS HETEROCYCLIC ARYL
DERIVATIVES OF ACRYLONITRILE
Gordon Northrop Walker, Morristown, William Laszlo
Bencze, New Providence, and John Benjamin Ziegler,
Summit, N.J., assignors to Ciba Corporation, New
York, N.Y., a corporation of Delaware
No Drawing. Filed Apr. 28, 1966, Ser. No. 545,875
9 Claims. (Cl. 260—294.9)

This is a continuation-in-part of application Ser. No. 466,826, filed June 24, 1965.

The present invention concerns and has for its object the provision of β-hydroxy-acrylic acid derivatives of the formula

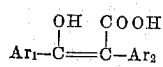

in which the radicals $Ar_1$ and $Ar_2$ stand for a mono- or bicyclic heterocyclic aryl radical, the enol ethers and esters thereof and the acid esters, amides and the nitrile, as well as salts of these compounds, and methods for their preparation.

A heterocyclic aryl radical is, for example, an aza-, oxa- and/or thiacyclic aryl radical, preferably a mono-azacyclic aryl radical, such as a 2-, 4- or especially 3-pyridyl radical, but also, for example, a 2- or 3-pyrryl, 3- or 4-pyrazyl, 2-, 4- or 5-imidazolyl, 2- or 3-furyl, 2- or 3-thienyl, 2-, 4- or 5-oxazolyl or thiazolyl, 3-, 4- or 5-isoxazolyl or isothiazolyl, 3- or 4-pyridazinyl, 2-, 4- or 5-pyrimidyl, 2-pyrazinyl, 2- or 3-indolyl, 1- or 3-isoindolyl, 2-, 3-, 4- or 8-quinolyl or 1-, 3-, 4- or 7-isoquinolyl radical.

These radicals $Ar_1$ and $Ar_2$, which may be identical or different, are unsubstituted or contain one or more than one of the same or of different substituents, such as lower alkyl, e.g. methyl, ethyl, n- or i-propyl, n-, i-, sec.- or tert-butyl, lower alkoxy, e.g. methoxy, ethoxy, n- or i-propoxy or n-butoxy, lower alkylmercapto, e.g. methyl- or ethylmercapto, halogen, e.g. fluoro, chloro or bromo, trifluoromethyl, nitro or amino, such as di-lower alkyl-amino, e.g. dimethylamino or diethylamino.

An enolether is, for example, such derived from an aliphatic or araliphatic alcohol, such as a lower alkanol or aralkanol, e.g. methanol, ethanol, n- or i-propanol, n-butanol or benzyl alcohol. An enol ester is preferably that of a carboxylic or sulfonic acid, such as a lower alkanoic or lower alkane or benzene sulfonic acid, e.g. formic, acetic, propionic, butyric, pivalic, methane sulfonic, ethane sulfonic or p-toluene sulfonic acid.

An ester of the present β-hydroxy-acrylic acids is preferably such derived from the above-mentioned aliphatic or araliphatic alcohols. A corresponding amide may be the unsubstituted amide or a mono- or di-lower alkyl-amide in which lower alkyl has the meaning given above.

The compounds of the present invention have valuable pharmacological properties. For example, they interfere with the carbohydrate metabolism and cause a fall in the sugar content of the blood. This can be demonstrated, for example, in glucose primed intact or adrenalectomized rats over an oral dosage range between about 1- to 200 mg./kg. They are, therefore, useful as hypoglycemic agents, preferably for oral administration. They are also useful starting materials or intermediates in the manufacture of other valuable compounds, especially medicines.

Particularly useful are the compounds of the formula

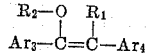

in which the radicals $Ar_3$ and $Ar_4$ stand for 2-, 3- or 4-pyridyl, 2- or 3-furyl, 2- or 3-thienyl, 2-, 3- or 4-quinolyl, 1-, 3- or 4-isoquinolyl, or one of these radicals containing one or two substituents selected from lower alkyl, lower alkoxy and halogen, $R_1$ for cyano, carbamyl, lower alkylcarbamyl, N,N-di-lower alkylcarbamyl and carbo-lower alkoxy and $R_2$ for hydrogen, lower alkyl or lower alkanoyl.

Compounds that are specially valuable are those of the formula

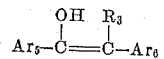

in which $Ar_5$ and $Ar_6$ stand for 2-, 4- or especially 3-pyridyl or (lower alkyl)-pyridyl and $R_3$ for carbamyl or cyano.

Above all, the present invention concerns compounds having the formulae

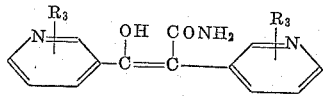

and

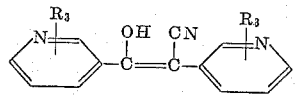

in which $R_3$ stands for hydrogen or methyl.

The compounds of the invention are prepared according to known methods, for example by (a) Reacting an ester, halide or anhydride of the acid $Ar_1$—COOH with an ester, amide or the nitrile of the acid or (b) Hydrolyzing a compound of the formula

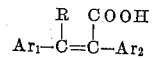

or an ester, amide or the nitrile thereof, in which R stands for an amino group or a halogen atom or (c) Isomerizing a compound of the formula

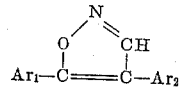

with a base or (d) Reacting a compound of the formula

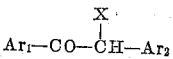

or an enolether or ester thereof, in which X stands for a halogen atom, with a cyanide or a reactive functional derivative of formic acid or (e) Reacting a compound of the formula $$Ar_1—CO—CH_2—Ar_2$$

or a reactive metal derivative thereof, with a halocyan or an aliphatic or araliphatic haloformiate or halooxalate and decarbonylating any glyoxalate obtained and, if desired, converting a free compound obtained into an enol ether or ester, an acid ester, amide, nitrile or salt thereof or converting a corresponding functional derivative or salt thereof into the free compound or into another of said derivatives and/or separating a mixture of isomers into the single isomers.

An ester of the heterocyclic acid $Ar_1$—COOH is preferably that of an aliphatic or araliphatic alcohol, for example of those mentioned above, a halide is preferably the chloride or bromide and an anhydride a pure or mixed anhydride. An ester of the acid $Ar_2$—$CH_2$—COOH is, for example, also that of the above-mentioned aliphatic or araliphatic alcohols, whereas its amide preferably is derived of a secondary amine, such as a di-lower alkyl-amine. Reaction (a) is preferably performed with the corresponding nitrile and in the presence of a condensing agent, for example an alkali metal, e.g. lithium, sodium or potassium, or an alcoholate thereof, advantageously a lower alkanolate, e.g. methanolate, ethanolate, n- or i-propanolate, n- or tert. butanolate, or an amide or hydride thereof or any other condensing agent useful in Claisen condensations. The acid halide is preferably reacted with the metal derivative, whereas the acid anhydride advantageously is reacted in the presence of a Lewis acid, e.g. boron trifluoride.

The esters or amides of the starting material mentioned under (b) are, for example, those mentioned for the final products. An amino group R therein may be unsubstituted or substituted, preferably disubstituted, and represents, for example di-lower alkylamino or advantageously lower alkyleneimino, aza-, oxa- or thia-alkyleneimino, such as, dimethylamino, diethylamino, di-n-propylamino or di-n-butylamino; pyrrolidino, piperidino, N-lower alkyl-piperazino, morpholino or thiamorpholino. A halogen atom R advantageously stands for bromine. The hydrolysis of said enamines is preferably carried out in an acidic medium, such as an aqueous acid, for example a mineral acid, such as a hydrohalic acid, e.g. hydrochloric, hydrobromic or hydriodic acid, perchloric, sulfuric or phosphoric acid, a sulfonic acid, such as a lower alkane or benzene sulfonic acid, e.g. methane, ethane or p-toluene sulfonic acid, or with the use of nitrous acid. The hydrolysis of the corresponding halo compound is preferably carried out in an alkaline medium, for example, an aqueous alkali metal hydroxide or carbonate, e.g. sodium or potassium hydroxide or carbonate, an alkali metal alkanolate, e.g. that mentioned above or any other agent suitable for the hydrolysis of unsaturated halogen compounds.

The compounds mentioned under (c) can be isomerized into the corresponding β-hydroxy-acrylonitriles by the action of alkaline agents, e.g. those mentioned hereinbefore, advantageously with an alkali metal lower alkanolate.

An enolether or ester of the starting material mentioned under (d) is, for example, such mentioned for the final products. A halogen atom therein stands preferably for chlorine or advantageously bromine. These compounds are reacted with a cyanide, preferably an alkali metal or ammonium cyanide, or a reactive functional derivative of formic acid, such as an ester or orthoester thereof, derived preferably of an aliphatic or araliphatic alcohol, or a formamide.

A reactive metal derivative of the starting material mentioned under (e) is, for example, an alkali metal, e.g. sodium or potassium, derivative thereof. The halocyan, haloformiate or halooxalate used as reactant is advantageously the chloro or bromo compound. The decarbonylation of a glyoxalate obtained may be performed by pyrolysis, advantageously in vacuo.

Any free compound obtained may be converted into one of said enol and/or carboxylic acid derivatives thereof according to methods known per se. For example, any free enol may be etherified, for example, with a reactive functional derivative of an aliphatic or araliphatic alcohol, such as its ester with a hydrohalic or sulfuric acid, or esterified with a reactive functional derivative of a corresponding acid, such as an anhydride or halide thereof. From a free acid a salt, an ester or amide may be prepared according to known methods, in order to obtain the derivatives mentioned in the beginning.

Alternatively any derivative obtained may be converted into the free compounds, for example, esters, ethers, amides or nitriles by hydrolysis, or into another derivative, for example, nitriles into amides by partial hydrolysis, esters into other esters by transesterification, substituted amides by reaction of the unsubstituted amides with a reactive ester of an alcohol, preferably a hydrohalic acid ester of a lower alkanol, acids or acid derivatives into amides, for example, by reaction of esters, anhydrides or acid halides with ammonia or amines. Also in the heterocyclic moiety a substituent, such as a lower alkyl group, may be added to a nitrogen atom present, for example, as shown for the substituted amides above.

The final products are obtained in the free form or in the form of their ammonium or metal salts (derived either from the acid or the enol), or acid addition salts respectively (derived from any basic heterocycle), depending on the conditions under which the process is carried out; the salts are also included in the present invention. Salts that are obtained can be converted into the free compounds for example, by reacting them with an acidic or basic agent respectively, such as a mineral acid or strong organic acid, e.g. those mentioned above, or a metal hydroxide, e.g. sodium, potassium or calcium hydroxide, an alkali metal carbonate, e.g. sodium or potassium carbonate or hydrogen carbonate, ammonia or a hydroxyl ion exchange preparation.

A resulting salt may also be converted into another salt, for example by its treatment with a suitable ion exchange preparation. Furthermore, a salt may be converted into another salt which is less soluble in the particular solvent used, for example by reacting it with an acid or base respectively, or a soluble salt thereof.

A free acid is converted into its salts, especially its ammonium, alkali or alkaline earth metal salts, e.g. sodium, potassium or calcium salts, by reaction with a corresponding hydroxide, carbonate, hydrogen carbonate or cation exchange preparation.

A free base is converted into a salt thereof, by its treatment with an acid or an anion exchange preparation. Preferred salts are those of therapeutically useful acids, such as inorganic acids, e.g. hydrochloric, hydrobromic, nitric, sulfuric or phosphoric acid, or organic acids, such as carboxylic or sulfonic acids, e.g. acetic, propionic, glycolic, malonic, succinic, maleic, hydroxymaleic, fumaric, malic, tartaric, citric, glucuronic, benzoic, salicylic, 4-aminosalicyclic, 2-acetoxybenzoic, pamoic, nicotinic, isonicotinic, methane sulfonic, ethane sulfonic, ethane 1,2-disulfonic, 2-hydroxyethane sulfonic, benzene sulfonic, toluene sulfonic or naphthalene 2-sulfonic acid, methionine, lysine, tryptophan or arginine. Other acid addition salts are useful as intermediates for the preparation of the pure parent compounds or in the manufacture of other salts, as well as for identification or characterization purposes. Addition salts primarily used for the latter are, for example, those with certain inorganic acids, e.g. perchloric, phosphotungstic, phosphomolybdic, chloroplatinic or Reinecke acid or with acidic organic nitro compounds, e.g. picric, picrolonic or flavianic acid. The bases are converted into salts, the salts are separated and the bases liberated from the salts. In view of the close relationship between the free compounds and the compounds in the form of their salts, whenever a free compound is referred to in this contex, a corresponding salt is also intended, provided such is possible and useful.

Resulting mixtures of isomeric compounds may be separated into single isomers based, for example, on physico-chemical differences, such as different solubilities or different boiling points. Thus, mixtures of isomers of racemates may be separated by fractional crystallization or fractional distillation, if necessary, by using a derivative thereof, e.g. a salt. Racemic products can likewise be resolved into the optical antipodes, for example, by reaction with optically active acids, separation of the diastereomeric salts and liberation of the bases from the salts.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention further includes any variant of the present process in which an intermediate product obtainable at any stage thereof is used as starting material and any remaining step or steps is/are carried out or the process is discontinued at any stage thereof or in which the starting materials are formed in situ or the reactants are used in the form of their salts. The present reactions are preferably performed with starting materials that give rise to the preferred compounds mentioned above.

The starting materials used are known or, if new, may be prepared according to known procedures. The enamines shown under (b) may be obtained by reaction of a compound having the formula

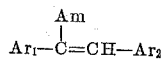

in which Am stands for a tertiary amino group, preferably pyrrolidino, with bromocyan or a lower alkyl bromoformiate [see, for example, J. Amer. Chem. Soc. 81, 5400 (1959)]. Alternatively such starting materials may be prepared by reacting a Grignard derivative of the acid $Ar_1$—$CH_2$—COOH (Ivanov reagent) with the nitrile $Ar_2$—CN. The corresponding halo-compounds may be prepared by reacting a trihalide $Ar_1$—$C(Hal)_3$ with an ester, amide or the nitrile of the acid $Ar_2$—$CH_2$—COOH.

The compounds shown under (c) can be prepared by formylation of those shown under (e), for example with the use of a lower alkyl formiate or orthoformiate under Claisen conditions, and reacting the resulting hydroxymethylene compound with hydroxylamine in order to obtain the desired isoxazoles.

The compounds shown under (d) can be prepared by halogenation of the corresponding unsubstituted compounds, either with a halogen itself or with the use of a halogenating agent, such as an N-halogenimide, e.g. N-bromo-succinimide.

The compounds of this invention are useful in the form of compositions, especially for enteral, e.g. oral use, which contain a pharmacologically effective amount of the active compound of this invention in admixture with a pharmaceutically acceptable organic or inorganic, solid or liquid carrier. For making up the latter, there are employed the usual carrier materials suitable for the manufacture of pharmaceutical compositions, such as water, gelatine, sugars, e.g. lactose, sucrose or glucose, starches, e.g. corn starch, wheat starch or rice starch, stearic acid or salts thereof, e.g. magnesium or calcium stearate, talc, vegetable oils, ethanol, stearyl alcohol, benzyl alcohol, gums, acacia, tragacanth, polyalkylene glycols, propylene glycol or any other suitable excipient or mixtures thereof. The compositions may be in solid form, e.g. capsules, tablets, dragees or suppositories, or in liquid form, e.g. solutions, suspensions or emulsions. If desired, they may contain auxiliary substances, such as preserving, stabilizing, wetting, emulsifying, coloring or flavoring agents, salts for varying the osmotic pressure and/or buffers. The above preparations are prepared according to the standard methods used for the manufacture of pharmaceutically acceptable compositions, which, if desired, may also contain, in combination, other physiologically useful substances.

The following examples are intended to illustrate the invention and are not to be construed as being limitations thereon. Temperatures are given in degrees centigrade and all parts are parts by weight.

Example 1

Dry sodium methoxide (prepared by dissolving 7.7 g. sodium in methanol and the evaporation of excess methanol on a steam cone in vacuo) is suspended in 500 ml. diethyl ether and 39.1 g. 3-pyridyl-acetonitrile and 50 g. ethyl nicotinate are added. The suspension is stirred and then allowed to stand overnight. The orange-brown sodium salt formed is collected, washed with ether, and dissolved in water. The maroon-colored, clarified aqueous solution is neutralized to a pH of about 7 by addition of dilute hydrochloric acid. The yellow crystals formed are collected, washed with water and air-dried. The so- obtained α,β - bis - (3-pyridyl)-β-hydroxy-acrylonitrile of the formula

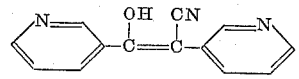

is recrystallized from methanol and melts at 251–252° (dec.).

Its infrared spectrum (Nujol) shows peaks at 4.59 and 6.35μ and the ultraviolet spectrum (Methanol) shows a $\lambda_{max}$ at 238, 274 and 336 mμ, ε=14,180, 5880 and 14,010 respectively. In 0.1 N potassium hydroxide the ultraviolet spectrum shows a $\lambda_{max}$ at 222, 272 and 330 mμ, ε=13,190, 8590 and 12,980 respectively, with inflection at 240 mμ, ε=9670.

Example 2

28.2 g. sodium methoxide are dissolved in 140 ml. absolute ethanol and to the rapidly stirred solution the mixture of 75.6 g. ethyl nicotinate and 47.6 g. 3-pyridyl-acetonitrile is added rapidly. The yellowish-brown mixture obtained is refluxed for 2.5 hours and allowed to cool to room temperature for 24 hours. Hereupon 500 ml. ice-water are added and the solution is filtered to remove a trace of blue-gray flocks. The filtrate is neutralized to a pH of about 6 to 7 with 30 ml. glacial acetic acid and the thick mush of yellow crystals is kept at room temperature overnight. It is filtered, the crystals are washed thoroughly with ice water and dried in vacuo at 70°. There is obtained the α,β-bis-(3-pyridyl)-β-hydroxy-acrylonitrile as a yellow microcrystalline powder melting at 252–253° with decomposition; it is identical with that obtained according to Example 1.

10.0 g. thereof are converted into the corresponding amide by treatment with 100 ml. concentrated sulfuric acid containing 10 ml. fuming sulfuric acid, for about 3 hours at room temperature. The mixture is poured over ice, the crystalline material collected, washed with dilute ammonia, water and methanol and recrystallized from ethanol.

Example 3

In the analogous manner shown in the previous examples, but using instead of 3-pyridyl-acetonitrile an equivalent amount of ethyl 2- or 3-pyridyl-acetate, the ethyl α-(2- or 3-pyridyl)-β-hydroxy-β-(3-pyridyl)-acrylate is obtained. Accordingly, the nitrile, amide and ethylester of the following acids can be prepared:

α,β-bis(5-methyl-3-pyridyl)-β-hydroxy-acylic acid,
α-(3-pyridyl)-β-hydroxy-β-(3-furyl or thienyl)-acrylic acid,
α-(4-quinolyl)-β-hydroxy-β-(3-pyridyl)-acrylic acid,
α,β-bis-(3-quinolyl)-β-hydroxy-acrylic acid,
α-(3-pyridyl) - β - (4-isoquinolyl)-β-hydroxy-acrylic acid and
α-(1-methyl-3-pyrryl) - β - (3-pyridyl)-β-hydroxy-acrylic acid.

Example 4

1.92 g. sodium are added to 27 ml. absolute ethanol which is then refluxed for 1 hour. Hereupon the solution of 7.7 g. 4-pyridyl-acetonitrile in 13.59 g. ethyl isonicotinate is added slowly and the stirred mixture is refluxed for 4 hours. It is poured into water, the whole is extracted with diethyl ether, the aqueous layer acidified with acetic acid and the precipitate formed filtered off and dried. It is recrystallized from dimethyl formamide-ethanol and washed with hot ethanol to yield the α,β-bis-(4-pyridyl)-β-hydroxy-acylonitrile of the formula

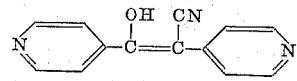

melting at 312–314° (decomp.).

Example 5

To the sodium ethoxide solution, prepared from 1.7 g. sodium and 25 ml. absolute ethanol, the mixture of 12.0 g. ethyl 2-furoate and 7.1 g. 3-pyridyl-acetonitrile is added dropwise while stirring. The reaction mixture is refluxed for 4 hours, then dissolved in water and acidified with acetic acid. The precipitate formed is collected and recrystallized from ethanol to yield the α-(3-pyridyl)-β-hydroxy-β-(2-furyl)-acrylonitrile of the formula

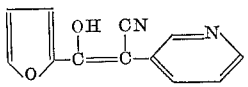

melting after another recrystallization from n-butanol at 255–258°.

Example 6

In the analogous manner described hereinbefore, the following compounds can be prepared from equivalent amounts of the corresponding starting material:

α-(3-pyridyl)-β-hydroxy-β-(2-thienyl)-acrylonitrile,
α-(3-pyridyl)-β-hydroxy-β-(3-pyrazolyl)-acrylonitrile,
α-(3-pyridyl)-β-hydroxy-β-(5-methyl-3-pyrazolyl)-acrylonitrile,
α-(4-pyridyl)-β-hydroxy-β-(4-thiazolyl)-acrylonitrile and
α-(3-pyridyl)-β-hydroxy-β-(2-methyl-4-thiazolyl)-acrylonitrile.

Example 7

3.8 g. sodium are reacted with an excess of methanol and the solution obtained is evaporated in vacuo. To the residue the mixture of 17.7 g. 3-pyridyl-acetonitrile and 25.8 g. ethyl 2-thiophenecarboxylate is added while stirring during ½ hour. Hereupon the mixture is allowed to stand overnight. It is then triturated with diethyl ether and dissolved in about 200 ml. water. The red solution is washed with diethyl ether and neutralized with 18% hydrochloric acid. The yellow precipitated formed is filtered off, washed with water and dried to yield the α-(1-pyridyl)-β-hydroxy-β-(2-thienyl)-acrylonitrile of the formula

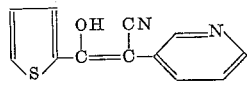

melting at 231–232° after recrystallization from ethanol.

Example 8

30.0 g. α,β-bis-(3-pyridyl)-β-hydroxy-acrylonitrile are dissolved in 200 ml. warm methanolic hydrochloric acid and the solution is cooled in an ice bath for about half an hour whereby crystallization occurs. The precipitate formed is filtered off and air dried to yield the α,β-bis-(3-pyridyl)-β-hydroxy-acrylonitrile monohydrochloride melting at 265°.

Example 9

1000 tablets each containing 0.5 g. of the active ingredient.

| Material: | G. |
|---|---|
| α,β-bis-(3-pyridyl)-β-hydroxy-acrylonitrile | 500.0 |
| Colloidal silica | 6.6 |
| Magnesium aluminum silicate | 20.0 |
| Methylcellulose | 13.3 |
| Stearic acid | 13.3 |
| Wheat starch (anhydrous) | 96.8 |
| Anydrous ethanol, q.s. | |
| Purified water, q.s. | |

Procedure: All powders with the exception of the silica and starch are passed through a screen having an opening of 1.2 mm. and mixed well. From the starch and 65 ml. water a paste is formed which is used to granulate the powders together with the ethanol. The wet granulate is passed through a screen with 2 mm. opening and dried at 43°. The dry granulate is broken in a hammer mill, passed through a screen with 1.2 mm. opening and compressed into tablets each weighing 0.65 g. using $^{15}/_{32}''$ standard concave punches.

What is claimed is:

1. A member selected from the group consisting of a compound having the formula $$\begin{array}{c} R_2\text{--}O \quad CN \\ | \quad\quad | \\ Ar_3\text{--}C\text{=}C\text{--}Ar_4 \end{array}$$

in which each of the radicals $Ar_3$ and $Ar_4$ stands for a member selected from the group consisting of 2-pyridyl, 3-pyridyl, 4-pyridyl, 2-furyl, 3-furyl, 2-thienyl, 3-thienyl, 2-quinolyl, 3-quinolyl, 4-quinolyl, 1-isoquinolyl, 3-isoquinolyl, 4-isoquinolyl and one of these radicals containing at most two substituents selected from the group consisting of lower alkyl, lower alkoxy and halogeno, and $R_2$ for a member selected from the group consisting of hydrogen, lower alkyl and lower alkanoyl, the alkali metal salts and therapeutically acceptable acid addition salts thereof.

2. A compound as claimed in claim 1 and having the formula

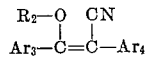

in which each of $Ar_5$ and $Ar_6$ stands for a member selected from the group consisting of 2-pyridyl, 4-pyridyl, (lower alkyl)-2-pyridyl and (lower alkyl)-4-pyridyl, the alkali metal and therapeutically acceptable acid addition salts thereof.

3. A compound as claimed in claim 1 and having the formula

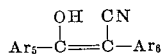

in which $Ar_5$ and $Ar_6$ stand for a member selected from the group consisting of 3-pyridyl and (lower alkyl)-3-pyridyl, the alkali metal and therapeutically acceptable acid addition salts thereof.

4. A compound as claimed in claim 1 and having the formula

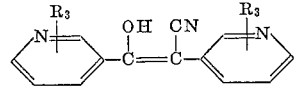

in which $R_3$ stands for a member selected from the group consisting of hydrogen and methyl, the alkali metal and therapeutically acceptable acid addition salts thereof.

5. A compound as claimed in claim 1 and being the α,β-bis-(3-pyridyl)-β-hydroxy-acrylonitrile.

6. A compound as claimed in claim 1 and being the α,β-bis-(3-pyridyl)-β-hydroxy-acrylonitrile hydrochloride.

7. A compound as claimed in claim 1 and being the α,β-bis-(4-pyridyl)-β-hydroxy-acrylonitrile.

8. A compound as claimed in claim 1 and being the α-(3-pyridyl)-β-hydroxy-β-(2-furyl)-acrylonitrile.

9. A compound as claimed in claim 1 and being the α-(3-pyridyl)-β-hydroxy-β-(2-thienyl)-acrylonitrile.

References Cited

Burger: Medicinal Chemistry, 2nd ed., Interscience, page 78.

WALTER A. MODANCE, *Primary Examiner.*

JOHN D. RANDOLPH, *Examiner.*

A. L. ROTHMAN, *Assistant Examiner.*